United States Patent
Ma et al.

(10) Patent No.: US 9,282,545 B2
(45) Date of Patent: *Mar. 8, 2016

(54) METHOD, APPARATUS AND SYSTEM FOR TRANSMITTING INFORMATION

(71) Applicant: Huawei Technologies Co., Ltd., Shenzhen, Guangdong (CN)

(72) Inventors: Jie Ma, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/192,298

(22) Filed: Feb. 27, 2014

(65) Prior Publication Data
US 2014/0177571 A1     Jun. 26, 2014

Related U.S. Application Data

(63) Continuation of application No. 13/114,209, filed on May 24, 2011, now Pat. No. 8,730,887, which is a continuation of application No. 12/771,863, filed on Apr. 30, 2010, now abandoned, which is a continuation of application No. PCT/CN2008/072796, filed on Oct. 23, 2008.

(30) Foreign Application Priority Data

Oct. 31, 2007   (CN) .......................... 2007 1 0124235

(51) Int. Cl.
*H04W 72/04*   (2009.01)
*H04W 74/00*   (2009.01)
(Continued)

(52) U.S. Cl.
CPC ........ *H04W 72/0406* (2013.01); *H04W 74/004* (2013.01); *H04W 76/021* (2013.01); *H04W 74/0833* (2013.01); *H04W 74/0866* (2013.01); *H04W 92/12* (2013.01)

(58) Field of Classification Search
CPC .......... H04W 74/004; H04W 74/0833; H04W 76/021; H04W 92/12; H04W 72/0406; H04W 74/0866
See application file for complete search history.

(56) References Cited

U.S. PATENT DOCUMENTS 6,757,293 B1   6/2004   Chuah et al.
7,711,365 B2   5/2010   Nakamata
(Continued)

FOREIGN PATENT DOCUMENTS

CN   1451251 A   10/2003
CN   1472901 A   2/2004
(Continued)

OTHER PUBLICATIONS

"3GPP TS 25.319—$3^{rd}$ Generation Partnership Project; Technical Specification Group Radio Access Network; Enhanced uplink; Overall description; Stage 2 (Release 7),"Version 7.3.0, $3^{rd}$ Generation Partnership Project, Valbonne, France (Sep. 2007).
(Continued)

*Primary Examiner* — Yee Lam
(74) *Attorney, Agent, or Firm* — Leydig, Voit & Mayer, Ltd.

(57) ABSTRACT

A method for transmitting information includes: by a NodeB, receiving information reported by a User Equipment (UE) through an Enhanced Dedicated Channel (E-DCH) transmission channel, and determining the UE corresponding to the received information according to UE ID information carried in the received information. A system and NodeB for transmitting information are also provided. Therefore, when random access data is transmitted between the UE and the NodeB, the NodeB can determine the UE from which the data is received, thus ensuring practicability of the transmission solution that uses High Speed Uplink Packet Access (HSUPA) to implement random access.

18 Claims, 2 Drawing Sheets

(51) Int. Cl.
*H04W 74/08* (2009.01)
*H04W 92/12* (2009.01)
*H04W 76/02* (2009.01)

(56) References Cited

U.S. PATENT DOCUMENTS

| | | | |
|---|---|---|---|
| 7,797,012 B1 | 9/2010 | Longoni et al. | |
| 7,864,722 B2 | 1/2011 | Yi et al. | |
| 7,894,390 B2 | 2/2011 | Nakamata et al. | |
| 7,894,444 B2 | 2/2011 | Lohr et al. | |
| 8,730,887 B2* | 5/2014 | Ma et al. | 370/329 |
| 2002/0045448 A1 | 4/2002 | Park et al. | |
| 2003/0016698 A1 | 1/2003 | Chang et al. | |
| 2003/0223360 A1 | 12/2003 | Yamazaki | |
| 2004/0017789 A1 | 1/2004 | Hoynck et al. | |
| 2004/0160925 A1 | 8/2004 | Heo et al. | |
| 2005/0053035 A1 | 3/2005 | Kwak et al. | |
| 2005/0063347 A1 | 3/2005 | Sarkkinen et al. | |
| 2005/0207359 A1 | 9/2005 | Hwang et al. | |
| 2005/0249118 A1 | 11/2005 | Terry et al. | |
| 2005/0254511 A1 | 11/2005 | Kekki | |
| 2006/0019671 A1 | 1/2006 | Chemiakina et al. | |
| 2006/0114877 A1 | 6/2006 | Heo et al. | |
| 2006/0156184 A1 | 7/2006 | Kim et al. | |
| 2006/0223567 A1 | 10/2006 | Kwak et al. | |
| 2007/0010270 A1 | 1/2007 | Dilon | |
| 2007/0042785 A1 | 2/2007 | Nakamata | |
| 2007/0047486 A1 | 3/2007 | Lee et al. | |
| 2007/0140123 A1 | 6/2007 | Fukui | |
| 2007/0218901 A1* | 9/2007 | Tenny | 455/436 |
| 2007/0258402 A1 | 11/2007 | Nakamata et al. | |
| 2008/0085719 A1 | 4/2008 | Kuchitbhotla et al. | |
| 2008/0108311 A1 | 5/2008 | Shindo | |
| 2008/0123585 A1 | 5/2008 | Granzow et al. | |
| 2008/0182594 A1 | 7/2008 | Flore et al. | |
| 2008/0253300 A1 | 10/2008 | Wakabayashi et al. | |
| 2008/0273610 A1 | 11/2008 | Malladi et al. | |
| 2008/0311923 A1 | 12/2008 | Petrovic et al. | |
| 2009/0022134 A1 | 1/2009 | Chun et al. | |
| 2009/0088185 A1 | 4/2009 | Beale | |
| 2009/0135771 A1* | 5/2009 | Pani et al. | 370/329 |
| 2009/0185540 A1 | 7/2009 | Pelletier et al. | |
| 2009/0268676 A1 | 10/2009 | Wiggard et al. | |
| 2012/0069811 A1 | 3/2012 | Ma et al. | |

FOREIGN PATENT DOCUMENTS

| | | |
|---|---|---|
| CN | 1534915 A | 10/2004 |
| CN | 1627844 A1 | 6/2005 |
| CN | 1645961 A1 | 7/2005 |
| CN | 1687244 A | 10/2005 |
| CN | 1790971 A | 6/2006 |
| CN | 1867161 A | 11/2006 |
| CN | 1889534 A | 1/2007 |
| CN | 1943144 A1 | 4/2007 |
| CN | 101006688 A | 7/2007 |
| CN | 101030810 A | 9/2007 |
| CN | 101030932 A | 9/2007 |
| CN | 101031094 A | 9/2007 |
| CN | 101035368 A | 9/2007 |
| CN | 101203048 A | 6/2008 |
| CN | 101426254 B | 12/2010 |
| EP | 1689127 A1 | 1/2006 |
| EP | 1737262 A1 | 12/2006 |
| EP | 1755355 A1 | 2/2007 |
| EP | 1796335 A1 | 6/2007 |
| EP | 1838057 A2 | 9/2007 |
| EP | 1841265 A2 | 10/2007 |
| EP | 2207276 A1 | 7/2010 |
| JP | 2000/228787 A | 8/2000 |
| WO | WO 01/72080 A1 | 9/2001 |
| WO | WO 2004/028041 A1 | 4/2004 |
| WO | WO 2006/081874 A1 | 8/2006 |
| WO | WO 2007/003707 A1 | 1/2007 |
| WO | WO 2007/073683 A1 | 7/2007 |
| WO | WO 2009016260 A1 | 2/2009 |
| WO | WO 2009055536 A2 | 4/2009 |
| WO | WO 2009/005958 A1 | 5/2009 |
| WO | WO 2009059518 A1 | 5/2009 |

OTHER PUBLICATIONS

"3GPP TS 25.321—3$^{rd}$ Generation Partnership Project; Technical Specification Group Radio Access Network; Medium Access Control (MAC) protocol specification (Release 7)," Version 7.6.0, 3$^{rd}$ Generation Partnership Project, Valbonne, France (Sep. 2007).

"3GPP TS 25.433—3$^{rd}$ Generation Partnership Project; Technical Specification Group Radio Access Network; UTRAN Iub interface Node B Application Part (NBAP) signaling (Release 6)," Version 6.15.0, 3$^{rd}$ Generation Partnership Project, Valbonne, France (Sep. 2007).

"3GPP TS 25.435—3$^{rd}$ Generation Partnership Project; Technical Specification Group Radio Access Network; UTRAN Iub Interface User Plane Protocols for Common Transport Channel data streams (Release 7)," Version 7.6.0, 3$^{rd}$ Generation Partnership Project, Valbonne, France (Sep. 2007).

Office Action in corresponding U.S. Appl. No. 12/769,809 (Jul. 9, 2013).

Extended European Search Report in corresponding European Patent Application No. 08848301.1 (Jun. 13, 2013).

"R2-074010—Enhanced Random Access with E-DCH," 3GPP TSG-RAN WG2 Meeting #59bis, Oct. 8- 12, 2007, 3GPP, Valbonne, France.

"R3-081424—On Resource Allocation," 3GPP TSG-RAN WG3 Meeting #60, May 5-9, 2008, 3GPP, Valbonne, France.

"TS 25.427—3$^{rd}$ Generation Partnership Project; Technical Specification Group Radio Access Network; UTRAN Iub/Iur interface user plane protocol for DCH data streams (Release 7)," Sep. 2007, V7.5.0, 3$^{rd}$ Generation Partnership Project, Valbonne, France.

2$^{nd}$ Office Action in related U.S. Appl. No. 12/769,809 (Feb. 12, 2013).

2$^{nd}$ Office Action in corresponding U.S. Appl. No. 13/305,138 (Jul. 30, 2012).

Office Action in corresponding U.S. Appl. No. 12/771,863 (Jun. 27, 2012).

Office Action in corresponding U.S. Appl. No. 13/305,138 (Feb. 16, 2012).

1$^{st}$ Office Action in corresponding U.S. Appl. No. 12/769,809 (Apr. 29, 2010).

1$^{st}$ Office Action in corresponding U.S. Appl. No. 12/114,209 (Feb. 16, 2012).

Rejection Decision in corresponding Chinese Patent Application No. 200710124235.1 (Jun. 12, 2010).

Re-examination Decision in corresponding Chinese Patent Application No. 200710124235.1 (Jul. 21, 2011).

Rejection Decision in corresponding Japanese Patent Application No. 2010-517260 (Jan. 24, 2012).

"3GPP TS 23.401—3$^{rd}$ Generation Partnership Project; Technical Specification Group Services and System Aspects; GPRS enhancements for E-UTRAN access (Release 80," May 2007, Version 1.0.0, 3$^{rd}$ Generation Partnership Project, Valbonne, France.

"TO S2-075726—Globally Unique Temporary Identities," 3GPP TSG SA WG2, Nov. 12-16, 2007, 3$^{rd}$ Generation Partnership Project, Valbonne, France.

"S2-073255—Discussion on the structure of S-TMSI," 3GPP TSG SA WG2 Meeting #59, Aug. 27-31, 2007, 3$^{rd}$ Generation Partnership Project, Helsinki, Finland.

Extended European Search Report in corresponding European Patent Application No. 08848009.0 (Mar. 3, 2011).

International Search Report in corresponding PCT Patent Application No. PCT/CN2008/072796 (Feb. 5, 2009).

Written Opinion in corresponding PCT Patent Application No. PCT/CN2008/072796 (Feb. 5, 2009).

International Search Report in corresponding PCT Patent Application No. PCT/CN2008/072841 (Feb. 5, 2009).

Written Opinion in corresponding PCT Patent Application No. PCT/CN2008/072841 (Feb. 5, 2009).

(56) References Cited

OTHER PUBLICATIONS

1st Office Action in corresponding Chinese Patent Application No. 200710124235.1 (Nov. 13, 2009).
"3GPP TS 25.433—3$^{rd}$ Generation Partnership Project; Technical Specification Group Radio Access Network; UTRAN lub interface Node B Application Part (NBAP) signaling (Release 6)," Mar. 2007, Version 6.13.0, 3$^{rd}$ Generation Partnership Project, Valbonne, France.
3GPP TS 25.827—3$^{rd}$ Generation Partnership Project; 1.28Mcps TOO Enhanced Uplink, Physical Layer Aspects (Release 7), Version 7.0.0, 3$^{rd}$ Generation Partnership Project, Valbonne, France.
"R2-073254—Further discussion on enhanced CELL_FACH in REL8," 3GPP TSG-RAN WG2 Meeting #59, Aug. 20-24, 2007, NSN and Nokia, Athens, Greece.
"R2-071927—Enhanced CELL_FACH state with E-OCH," 3GPP TSG-RAN WG3 Meeting #57bis, Oct. 8-11, 2007, NSN and Nokia, Sophia Antipolis, France.
LG Electronics, "Discussion on RACH enhancements," R2-074165, 3GPP TSGRAN WG2 #59 bis (Oct. 8-12, 2007, Shanghai, China).
3$^{rd}$ Generation Partnership Project, Technical Specification Group Radio Access Network; UTRAN lub interface Node B Application Part (NBAP) Signaling (3GPP TS 25.433) (Release 7, Version 7.6.0) (Sep. 2007).
Office Action in corresponding U.S. Appl. No. 13/114,209 (May 31, 2013).
Final Office Action in corresponding U.S. Appl. No. 13/114,209 (Nov. 14, 2012).
"3$^{rd}$ Generation Partnership Project; Technical Specification Group Radio Access Network; High Speed Downlink Packet Access: lub/lur protocol aspects (Release 5)," 3GPP TR 25.877, V5.1.0, pp. 1-49, 3$^{rd}$ Generation Partnership Project, Valbonne, France (Jun. 2002).
"UEs Multiplexing in Frame Protocol for HS-DSCH," TSG-RAN Working Group 3 Meeting #25, Makuhari, Japan, R3-013321, 3$^{rd}$ Generation Partnership Project, Valbonne, France (Nov. 26-30, 2001).
"3$^{rd}$ Generation Partnership Project; Technical Specification Group Radio Access Network; 1.28 Mcps TDD Enhanced Uplink; Physical Layer Aspects (Release 7)," 3GPP TR 25.827, V7.0.0, 3$^{rd}$ Generation Partnership Project, Valbonne, France (Mar. 2007).
Office Action in corresponding U.S. Appl. No. 14/318,583 (Jul. 27, 2015).

* cited by examiner

METHOD, APPARATUS AND SYSTEM FOR TRANSMITTING INFORMATION

CROSS-REFERENCE TO RELATED APPLICATIONS

This application is a continuation of U.S. patent application Ser. No. 13/114,209 filed on May 24, 2011, which is a continuation of U.S. patent application Ser. No. 12/771,863 filed on Apr. 30, 2010, which is a continuation of International Patent Application No. PCT/CN2008/072796, filed on Oct. 23, 2008. The International Patent Application claims priority to Chinese Patent Application No. 200710124235.1, filed on Oct. 31, 2007. The aforementioned patent applications are hereby incorporated by reference in their entireties.

FIELD OF THE INVENTION

The present invention relates to mobile communication technologies, and in particular, to a method, apparatus, and system for transmitting information.

BACKGROUND OF THE INVENTION

In a mobile communication system, the mobile communication is implemented between a base station (It is assumed that the base station is a NodeB) and a User Equipment (UE) through exchange of uplink and downlink information.

To enhance the data transmission rate, a solution is put forward in the industry: using High Speed Downlink Packet Access (HSDPA) in the downlink common channel, thus making the theoretical downlink transmission rate as high as 100 Kbps. However, the downlink transmission rate is affected by the uplink transmission rate. For example, uplink transmission is currently performed on a Random Access Channel (RACH), which leads to slow uplink response and affects the downlink transmission rate.

To solve the problem, another solution is put forward in the industry: using High Speed Uplink Packet Access (HSUPA) to implement random access. This solution uses an Enhanced Dedicated Channel (E-DCH) to transmit the specific messages in the uplink transmission at random access.

During the development of the present invention, at least following problems are found in the conventional art:

The E-DCH transmission channel is a dedicated channel. It is necessary to allocate a dedicated E-DCH transmission channel to the UE before the E-DCH transmission channel is used for transmission. In the subsequent transmission process, after receiving the information transmitted from the specific channel, the NodeB determines the UE to which the information belongs according to the channel resource, and enables information transmission between the UE and the NodeB.

If the HSUPA is used to transmit the random access data, the UE needs to be able to use the E-DCH transmission channel randomly; that is, the E-DCH transmission channel serves as a shared channel Evidently, this mode makes the NodeB unable to determine the UE from which the data is received, and the information transmission is disabled between the UE and the NodeB. Thus the NodeB is unable to send the information transmitted by the UE to the control device such as a Radio Network Controller (RNC).

SUMMARY OF THE INVENTION

The Aspects of the present invention provide a method, apparatus, and system for transmitting information so that a base station can determine a UE corresponding to information received through an E-DCH transmission channel.

The objectives of the present invention are fulfilled through the following technical solution:

A method for transmitting information in an aspect of the present invention includes:
    by a base station, receiving information reported by a UE through an E-DCH transmission channel, and determining the UE corresponding to the received information according to UE ID information carried in the received information.

A system for transmitting information in an aspect of the present invention includes:
    a UE, configured to report information to a base station through an E-DCH transmission channel; and
    the base station, configured to: receive the information reported by the UE through the E-DCH transmission channel, and determine the UE corresponding to the received information according to UE ID information carried in the received information.

A base station for transmitting information in an aspect of the present invention includes:
    a transceiver module, configured to receive information reported by a UE through an E-DCH transmission channel; and
    a determining module, configured to determine the UE corresponding to the received information according to UE ID information carried in the information received by the transceiver module.

In the aspects of the present invention, the base station determines the UE corresponding to information reported by the UE through an E-DCH transmission channel Therefore, when the UE transmits random access data to the base station through HSUPA, the base station can determine the UE from which the data is received. Compared with the conventional art, the aspects of the present invention can ensure practicability of the transmission solution that uses HSUPA to implement random access.

DETAILED DESCRIPTION OF THE EMBODIMENTS

For better understanding of the objective, technical solution and merits of the present invention, the following describes the present invention in detail with reference to the accompanying drawings.

To enable a base station like a Universal Mobile Telecommunications System (UMTS) NodeB to determine the UE corresponding to the information received through an E-DCH transmission channel, the embodiments of the present invention add ID information such as UE ID into the information reported by the UE to the NodeB, and the NodeB can determine the UE from which the information is reported according to the UE ID in the information. Specifically, the UE ID may be a UTRAN Radio Network Temporary Identity (U-RNTI), a Cell RNTI (C-RNTI), a High Speed Downlink Shared Channel RNTI (H-RNTI), or other IDs such as an International Mobile Subscriber Identity (IMSI) and a Temporary Mobile Subscriber Identity (TMSI).

The technical solution under the present invention is detailed below with reference to exemplary embodiments. In embodiments below, NodeB is used as an exemplary base station and RNC is used as an exemplary radio network control device.

First Embodiment

A UE ID is added into each layer-2 packet reported by the UE to the NodeB. When receiving a layer-2 packet, the NodeB determines the UE from which the packet is reported according to the UE ID carried in the packet. Layer 2 is an air interface protocol layer, which includes multiple protocols, generally including the Medium Access Control (MAC) protocol, Radio Link Control (RLC) protocol, Packet Data Convergence Protocol (PDCP).

This embodiment ensures that the NodeB can determine the UE corresponding to each layer-2 packet sent on the E-DCH transmission channel, and this embodiment is very easy to implement.

Second Embodiment

Figure 1:
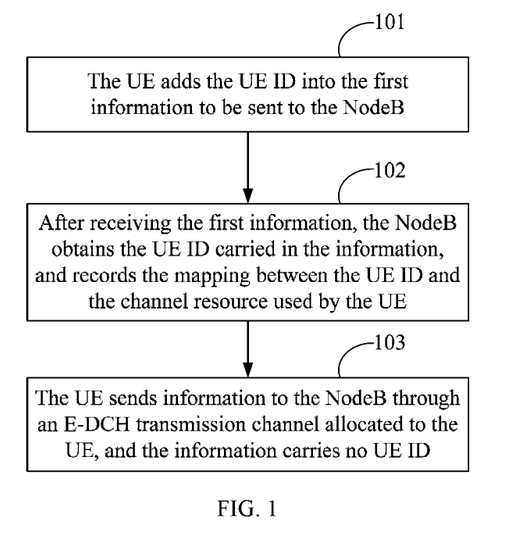
FIG. 1 is a flowchart of a second embodiment of the present invention.

As shown in FIG. 1, the process of implementing this embodiment includes the following steps:

Step 101: The UE adds the UE ID into the first information to be sent to the NodeB.

Before uplink access, the UE contends for the initial resource. In this embodiment, the UE uses the HSUPA technology in the uplink direction, and the initial resource obtained is an E-DCH transmission channel. The first information reported by the UE to the NodeB needs to be reported through the E-DCH transmission channel. In this embodiment, a UE ID is further carried in the first information. Besides, although the E-DCH transmission channel serves as a shared channel in this embodiment, after the UE contends for the channel resource successfully, the UE uses this resource regularly to send uplink data in a time period.

Specifically, a MAC-e entity in the UE may process the reported information. In this case, the MAC-e entity needs to add a UE ID into the first information to be sent.

The first information may also be processed by a MAC-c entity in the UE. In this case, because the information sent by the MAC-c entity itself already carries the UE ID, this method can use the MAC-c entity in the UE directly, without adding functions of the MAC-e entity.

Step 102: After receiving the first information, the NodeB obtains the UE ID carried in the information, and records the mapping between the UE ID and the channel resource used by the UE.

Specifically, after receiving the first information, the NodeB needs to decode the information. After the information is decoded correctly, it is deemed that the UE can continue using the E-DCH resource, and the NodeB notify the UE the E-DCH resource can be used continually.

In the case that the MAC-c entity in the UE processes the reported information, a capability of decoding MAC-c needs to be added into the NodeB, or a MAC-c entity is added into the NodeB. In the case that the MAC-e in the UE processes the reported information, a capability of reading the UE ID carried in the first information from the MAC-e entity needs to be added into the NodeB.

Step 103: The UE sends information to the NodeB through an E-DCH transmission channel allocated to the UE, and the information carries no UE ID.

For the UE, no matter whether the information is sent by a MAC-c entity or a MAC-e entity in step 101, the information is sent by a MAC-e entity in step 103.

After the UE contends for the channel resource successfully, the UE uses this resource to send uplink data regularly in a time period. Through the foregoing processing in this embodiment, the NodeB can determine the UE corresponding to the information received through the E-DCH transmission channel, thus saving more air interface resources.

Through the foregoing embodiments, the NodeB determines the UE corresponding to the information received through the E-DCH transmission channel.

Besides, in the uplink transmission process, the NodeB needs to send the information sent by the UE to the RNC. The RNC also needs to determine the UE corresponding to the received information.

Therefore, after determining the UE corresponding to the received information, the NodeB needs to send the information to the RNC so that the RNC can also determine the UE corresponding to the received information.

For the RNC, the channel between the RNC and the NodeB may be an RACH transmission channel or an E-DCH transmission channel. The scenarios corresponding to the two channels are described below.

If the channel is an RACH transmission channel, after receiving the data transmitted through the E-DCH transmission channel, the NodeB needs to add a UE ID into the received information to convert the information into a traditional RACH Frame Protocol (FP) frame and send the modified RACH FP frame to the RNC through the RACH transmission channel of the Iub interface. In this solution, a MAC-c entity is added into the NodeB, or the functions of the MAC-c are added into the MAC-e entity of the NodeB so that the NodeB can add a UE ID into the received information. Accordingly, the RNC can receive and resolve data from the RACH transmission channel of the Iub interface without being modified.

Figure 2:
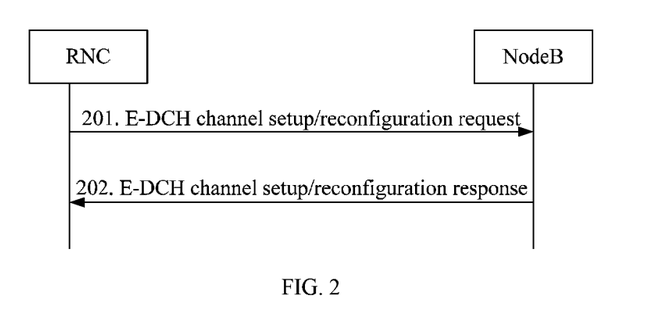
FIG. 2 is a sequence diagram of configuring an E-DCH transmission channel between an RNC and a NodeB in the second embodiment of the present invention.

If the channel is an E-DCH transmission channel, the E-DCH transmission channel needs to be configured between the RNC and the NodeB first. As shown in FIG. 2, the configuration process includes the following steps:

Step 201: The RNC sends a channel setup/reconfiguration request to the NodeB, requesting the NodeB to set up an E-DCH transmission channel.

The RNC needs to send a request to the NodeB, indicating the parameters required for channel setup/reconfiguration. Specifically, the parameters may include the signature list and/or relevant physical layer channel parameters, both of which may be used when the UE performs random access through the E-DCH. The parameters may include physical layer parameters, transmission channel parameters or transmission bearer parameters any of which may be required when the UE performs random access through the E-DCH or any combination thereof, and the parameters may also include the signature list or the relevant physical layer channel parameters or both of them. The sent parameters may be sent through a new message; or the parameters are added into a message of the existing process, which means the parameters are sent through the existing process.

If the RNC sends the signature list used when the UE performs random access through the E-DCH to the NodeB, the RNC may send the signature list in many modes. This embodiment provides several modes: (1) A table is stipulated in the protocol, and a table number is assigned and sent; or (2)

a signature sequence is given and sent; or (3) the signature list is sent in the mode like Preamble Signatures in the traditional Physical Random Access Channel (PRACH). These sending modes may be performed in the process of setting up the common transmission channel.

If the RNC sends the relevant physical layer channel parameters required when the UE performs random access through the E-DCH to the NodeB, the RNC may send the parameters in many modes. This embodiment provides the specific processing modes for the RNC to notify the NodeB to assign the relevant resources through configuration of the channel such as the Arrest Indicated Channel (AICH), High Speed-DSCH-related Shared Control Channel (HS-SCCH), and High Speed Physical Downlink Shared Channel (HS-PDSCH). The detailed modes are as follows:

(1) An Arrest Indication (AI) is added into an AICH sent to the NodeB, indicating that the AICH can be used at the time of performing random access through an E-DCH. In this case, the AICH may be modified in the process of setting up the common transmission channel.

(2) The second mode is specific to the HS-SCCH. In this mode, the HS-SCCH sent to the NodeB may carry at least one of these items: physical-layer parameters, HS-SCCH format number, and HS-SCCH time sequence relation. In this mode, the HS-SCCH may be modified in the process of reconfiguring the physical shared channel. The physical-layer parameters may be channelized codes and power. The power may be the maximum transmit power and/or initial transmit power; for the HS-SCCH format number, the current HS-SCCH comes in three formats, and the specific format needs to be indicated; the HS-SCCH time sequence relation may be a contrast between the HS-SCCH and an absolute time sequence, for example, an offset from the AICH or Primary Common Control Physical Channel (P-CCPCH), measured in timeslots or 256 chips.

(3) The third mode is specific to the HS-PDSCH. In this mode, the HS-PDSCH sent to the NodeB may carry at least one of these items: physical-layer parameters, HS-PDSCH time sequence relation, and transmission channel parameters. In this mode, the HS-PDSCH may be modified in the process of setting up the common transmission channel. Besides, the physical-layer parameters may include at least one of these items: channelized code, modulation mode, power, and TB size; the HS-PDSCH time sequence relation may be a contrast between an HS-PDSCH and an absolute time sequence, for example, an offset from an AICH or P-CCPCH, measured in timeslots or 256 chips; the transmission channel parameters include an indication of the MAC format, specifically including MAC-hs, MAC-ehs in DPA enhancement, or a newly defined format.

If the RNC sends the relevant E-DCH physical-layer parameters, transmission channel parameters, and transmission bearer parameters used by the enhanced RACH to the NodeB, the RNC may send the parameters in many modes.

The E-DCH physical-layer parameters may include the parameters in the following table, and such parameters may be added in the process of setting up the common transmission channel E-DPCH Information
>Maximum Set of E-DPDCHs
>Puncture Limit
>E-TFCS Information
>E-TTI
>E-DPCCH Power Offset
>HARQ Info for E-DCH -continued E-DCH FDD Information
F-DPCH Information
>Power Offset Information
>>PO2
>FDD TPC DL Step Size
>Limited Power Increase
>Inner Loop DL PC Status The transmission channel parameters may include the parameters in the following table. Specifically, an indication may be added into the physical shared channel reconfiguration to indicate that the parameter can be used at the time of performing random access through an E-DCH. Alternatively, the parameter is directly added into the process of setting up the common transmission channel E-AGCH And E-RGCH/E-HICH FDD Scrambling Code
E-AGCH Code FDD Information
E-RGCH/E-HICH Code FDD Information The transmission bearer may include the optional parameters in the following table. These optional parameters may be added in the process of setting up the common transmission channel

| IE/Group Name | Presence | Range | IE Type and Reference | Semantics Description |
|---|---|---|---|---|
| RL Specific E-DCH Information | | 1..<maxnoofEDCHMACdFlows> | | |
| >Binding ID | O | | 9.2.1.4 | Shall be ignored if bearer establishment with ALCAP. |
| >Transport Layer Address | O | | 9.2.1.63 | Shall be ignored if bearer establishment with ALCAP. |
| >>>>Common Transport Channel ID | O | | 9.2.1.14 | |
| >>>>Transport Format Set | O | | 9.2.1.59 | For the UL. |
| >>>>TNL QoS | O | | 9.2.1.58A | Shall be ignored if bearer establishment with ALCAP. |
| E-AGCH Power Offset | O | | 9.2.2.13Id | |
| E-RGCH Power Offset | O | | 9.2.2.13Ie | |
| E-HICH Power Offset | O | | 9.2.2.13If | |

Step 202: The NodeB returns a channel setup/reconfiguration response to the RNC, notifying the information about the established E-DCH transmission channel.

The NodeB sets up the corresponding E-DCH transmission channel according to the parameters sent by the RNC, and returns the information about the established channel to the RNC. Specifically, the transmission-layer address and/or Binding ID is notified to the NodeB. Alternatively, other relevant parameters of the E-DCH transmission channel may be notified to the NodeB.

Afterward, information may be transmitted between the NodeB and the RNC through the established E-DCH transmission channel.

Moreover, after the E-DCH transmission channel is set up, if the NodeB needs to send information related to UE to the RNC, the UE ID needs to be notified to the RNC. Specifically, after receiving the information sent by the UE, the NodeB also needs to add the UE ID into the received information, with a view to modifying the data to new E-DCH data, or with a view to modifying the E-DCH FP frame corresponding to the data to the FP frame that includes the UE ID.

The modified FP frame is shown in the following table.

| | | |
|---|---|---|
| Header CRC | | FT |
| Header CRC cont | | FSN |
| Spare | | Numbers of subframe |
| CFN | | |
| UEid1 | | |
| UEid1 | | |
| UEid2 | | |
| UEid2 | | |
| UEidn | | |
| UEidn | | |
| UE1 | N of HARQ Retransm | 1st subframe NO. |
| N of MAC-es PDUs | | First DDI |
| First DDI | First N | |
| Last DDI | | Last N |
| Last N cont | PAd | |
| UE1 | N of HARQ Retransm | Last subframe NO. |
| N of Macs-es PDUs | | First DDI |
| First DDI | First N | |
| Last DDI | | Last N |
| Last N cont | PAd | |
| UE1 | N of HARQ Retransm | Last subframe NO. |
| N of MAC-es PDUs | | First DDI |
| First DDI | First N | |
| Last DDI | | Last N |
| Last N cont | PAd | |
| New IE flag | | |
| First MAC-es PDU of 1st subframe of UE1 | | |
| Last MAC-es PDU of Last subframe of UE1 | | |
| Last MAC-es PDU of Last subframe of UEn | | |
| Payload CRC | | |
| Payload CRC cont | | |

In the foregoing solution which uses an E-DCH transmission channel to transmit data to the RNC, it is necessary to modify the processing logic of the RNC so that the RNC can resolve the UE ID. Specifically, the MAC-es entity may be modified accordingly. Nevertheless, the modification is based on the precondition that the entity corresponding to the UE ID resolved in the RNC is a MAC-es entity. If the entity corresponding to the UE ID is another entity, the entity needs to be modified accordingly.

The foregoing embodiment reveals that: Random access can also be performed between the RNC and the NodeB through an E-DCH, thus saving the channel resources between the RNC and the NodeB.

Figure 3:
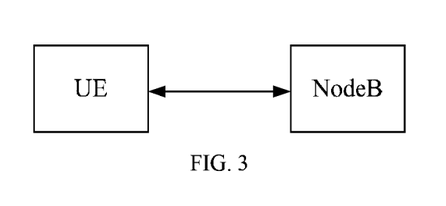
FIG. 3 shows a structure of a system in an embodiment of the present invention.

As shown in FIG. 3, in the system in this embodiment, the channel between the UE and the NodeB is an E-DCH transmission channel.

The UE is adapted to add an ID like a UE ID into the information reported to the NodeB through an E-DCH transmission channel.

The NodeB determines the UE from which the information is received according to the ID like a UE ID in the information received through the E-DCH transmission channel.

Specifically, the UE may add a UE ID into any information reported through the E-DCH transmission channel. Accordingly, the NodeB determines the UE from which the information is reported according to the UE ID in the received information directly.

The UE may also add a UE ID into the first information reported through the E-DCH transmission channel, but add no UE ID into the remaining information. Accordingly, the NodeB needs to record the mapping between the UE ID in the first information and the channel resource used by this UE.

Afterward, when the NodeB receives the information sent by the UE again, the NodeB determines the UE corresponding to the information simply according to the mapping between the UE ID and the channel resource.

If the UE adds the UE ID into the first information reported, a MAC-e entity in the UE may process the reported information. In this case, the MAC-e entity adds the UE ID into the first information to be sent.

As mentioned above, the first information of the UE may be reported by the MAC-c entity, and the subsequent information is reported by the MAC-e entity.

For the NodeB, regardless of the foregoing processing scenario, after receiving the first information, the NodeB needs to decode the information. After the information being decoded correctly, it is deemed that the UE can continue using the E-DCH resource, and the decoding result is notified to the UE. Afterward, the UE can use the allocated E-DCH resource to send information to the NodeB.

After the UE contends for the channel resource successfully, the UE uses this resource to send uplink data regularly in a time period. Through the foregoing processing in this embodiment, the NodeB can determine the UE corresponding to the information received through the E-DCH transmission channel, thus saving more air interface resources.

In this system, the NodeB further needs to send the received information to the RNC and enable the RNC to determine the UE corresponding to the received information.

As described above, the channel between the RNC and the NodeB may be an RACH transmission channel or an E-DCH transmission channel. If the channel is an RACH transmission channel, after receiving the data transmitted through the E-DCH transmission channel, the NodeB needs to add a UE ID into the received information to convert the information into a traditional RACH FP frame and send the modified RACH FP frame from the RACH transmission channel of the Iub interface to the RNC. The detailed implementation is described above, and is not described further.

If the channel between the RNC and the NodeB is an E-DCH transmission channel, the E-DCH transmission channel needs to be configured between the RNC and the NodeB first.

Accordingly, the RNC needs to send a channel setup/reconfiguration request to the NodeB, requesting the NodeB to set up an E-DCH transmission channel. The request sent by the RNC is described above, and is not described further.

The NodeB needs to set up the corresponding E-DCH transmission channel according to the parameters sent by the RNC, and return the information about the established channel to the RNC.

Afterward, information may be transmitted between the NodeB and the RNC through the established E-DCH transmission channel.

After the E-DCH transmission channel is set up, if the NodeB needs to send UE information to the RNC, the UE ID needs to be notified to the RNC. Specifically, after receiving the information sent by the UE, the NodeB also needs to add the UE ID into the received information, with a view to modifying the data to new E-DCH data, or with a view to modifying the E-DCH FP frame corresponding to the data to the FP frame that includes the UE ID.

Accordingly, the RNC needs to resolve the received information to obtain the UE ID. For example, for the new E-DCH data and E-DCH FP frame, the MAC-es entity in the RNC needs to be modified. The detailed implementation is described above, and is not described further.

The foregoing method and system embodiments reveal that: In the apparatus embodiment herein, the NodeB is configured to receive the information reported by the UE through the E-DCH transmission channel, and determine the UE corresponding to the received information according to the UE ID information carried in the received information.

Depending on the implementation conditions, the NodeB is configured to determine the UE corresponding to the information according to the UE ID information carried in each received information; or is configured to determine the UE corresponding to the information and the channel resource used by the UE according to the UE ID carried in the first information reported by the UE, and determine that other information on the channel is the information reported by the UE.

For the purpose of converting the information sent by the UE through the E-DCH transmission channel into information resolvable to the RNC, if the channel between the NodeB and the RNC is an RACH transmission channel, the NodeB may be further configured to: add an UE ID into the information reported by the UE through the E-DCH transmission channel, convert the information into an RACH FP frame, and send the modified RACH FP frame to the RNC through the RACH transmission channel.

If the channel between the NodeB and the RNC is an E-DCH transmission channel, the NodeB may be further configured to: add an UE ID into the information transmitted by the UE through the E-DCH transmission channel and convert the data in the information into the E-DCH data that carries the UE ID, or convert the information into an FP frame that carries the UE ID, and send the modified information to the RNC through the E-DCH transmission channel.

If the channel between the NodeB and the RNC is an E-DCH transmission channel, the NodeB is further adapted to: set up an E-DCH transmission channel according to the parameters in the request sent by the RNC, and return a channel setup/reconfiguration response to the RNC, indicating the information about the established E-DCH transmission channel.

The interaction between the NodeB and other devices such as the UE and RNC is detailed in the method embodiment and the system embodiment above, and is not described further.

The foregoing embodiment reveals that: Random access can also be performed between the RNC and the NodeB through an E-DCH, thus saving the channel resources between the RNC and the NodeB.

Figure 4:
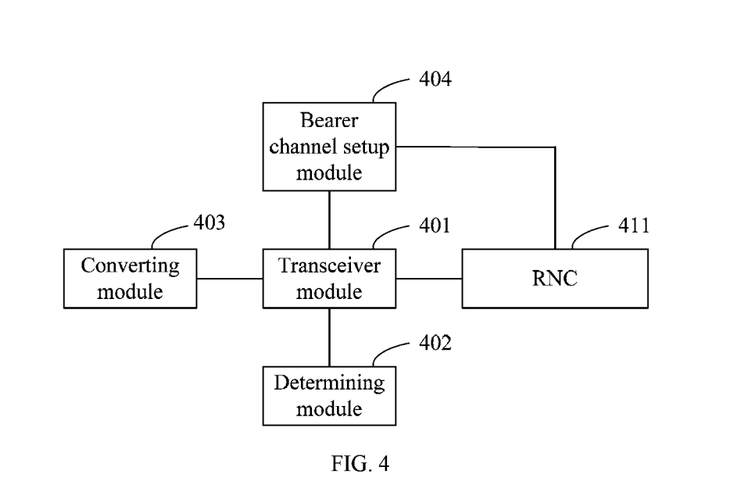
FIG. 4 shows a structure of a NodeB in an embodiment of the present invention.

A NodeB for transmitting information is provided in an embodiment of the present invention. As shown in FIG. 4, the NodeB includes:

a transceiver module 401, configured to receive information reported by a UE through an E-DCH transmission channel; and a determining module 402, configured to determine the UE corresponding to the received information according to UE ID information carried in the information received by the transceiver module 401.

The determining module 402 may be further configured to determine the UE corresponding to the information according to the UE ID information carried in each received information; or is adapted to determine the UE corresponding to the information and the channel resource used by the UE according to the UE ID carried in the first information reported by the UE, and determine that other information received on the channel is the information reported by the UE.

The NodeB may further include a converting module 403. The converting module is configured to: convert the information reported by the UE through the E-DCH transmission channel into an RACH FP frame, and use the transceiver module 401 to send the modified RACH FP to the RNC 411 through the RACH transmission channel; or, the converting module 403 is configured to: convert the information sent by the UE through the E-DCH transmission channel into E-DCH data that carries the UE ID, or convert the information into an FP frame that carries the UE ID, and use the transceiver module 401 to send the modified information to the RNC 411 through the E-DCH transmission channel.

The NodeB may further include a bearer channel setup module 404, which is configured to: set up an E-DCH transmission channel according to the parameters in the request sent by the RNC 411, and return a channel setup/reconfiguration response to the RNC 411 through the transceiver module 401, indicating the information about the established E-DCH transmission channel.

The NodeB provided herein determines the UE from which the data is received, and ensures practicability of the transmission solution that uses HSUPA to implement random access.

Based on the descriptions of the preceding embodiments, those skilled in the art may understand that the present invention may be implemented by hardware only or by software and a necessary universal hardware platform. The technical solution of the present invention may be embodied by a software product which may be stored in a nonvolatile storage medium. The storage medium can be a Compact Disk Read-Only Memory (CD-ROM), a USB disk, or a mobile hard disk. The software product includes a number of instructions that enable a computer device (personal computer, server, or network device) to execute the methods provided in the embodiments of the present invention.

The above descriptions are merely preferred embodiments of the present invention, but not intended to limit the scope of the present invention. Any modification, equivalent substitution or improvement without departing from the spirit and principle of the present invention should be covered in the scope of protection of the present invention.

What is claimed is:

1. A method for transmitting information, comprising:
   converting, by a base station, a protocol layer data packet received from a user equipment (UE) into a Frame Protocol (FP) frame with a UE identity (ID) of the UE; and
   sending, by the base station, the FP frame with the UE ID of the UE to a radio network control device through an enhanced dedicated channel (E-DCH) resource, wherein the UE ID is for informing the radio network control device which UE the FP frame belongs to, wherein the E-DCH resource comprises a resource for transmission between the base station and the radio network control device;
   wherein the method further comprises:
   receiving, by the base station, a request for configuring or reconfiguring an E-DCH related resource, sent by the radio network control device, wherein the E-DCH related resource comprises the E-DCH resource and an E-DCH resource for transmission between the UE and the base station, and the E-DCH related resource corresponds to an E-DCH as a common transmission channel; and
   configuring or reconfiguring, depending on the request received, by the base station, the E-DCH related resources in accordance with a parameter in the received request;
   wherein the parameter in the received request comprises at least one of: a signature list used when the UE performs a random access procedure through the E-DCH resource for transmission between the UE and the base station, and other parameter required when the UE performs the random access procedure through the E-DCH related resource, wherein the other parameter comprises at least one of a relevant physical-layer parameter, a transmission channel parameter and a transmission bearer parameter.

2. The method of claim 1, further comprising:
receiving, by the base station, the protocol layer data packet from the UE through the E-DCH resource for transmission between the UE and the base station, wherein the protocol layer data packet includes data and the UE ID of the UE; and
determining, by the base station, which UE the protocol layer data packet belongs to according to the UE ID included in the protocol layer data packet.

3. The method of claim 2, wherein the protocol layer data packet is every protocol layer data packet sent by the UE to the base station through the E-DCH resource for transmission between the UE and the base station.

4. The method of claim 2, wherein the protocol layer data packet is a protocol layer data packet firstly sent by the UE to the base station through the E-DCH resource for transmission between the UE and the base station.

5. The method of claim 1, further comprising:
receiving, by the base station, the protocol layer data packet from the UE through the E-DCH resource for transmission between the UE and the base station, wherein the protocol layer data packet includes data; and
determining, by the base station, which UE the protocol layer data packet belongs to according to the UE ID included in a protocol layer data packet other than the protocol layer data packet.

6. The method of claim 1, further comprising:
sending, by the base station, a response to the radio network control device to indicate information of the E-DCH related resource being configured or reconfigured.

7. A system for transmitting information, comprising a base station and a radio network control device, wherein
the base station is configured to configure or reconfigure, depending on a request received from the radio network control device, an enhanced dedicated channel (E-DCH) related resource in accordance with a parameter in the request, wherein the E-DCH related resource comprises an E-DCH resource for transmission between the base station and the radio network control device and an E-DCH resource for transmission between the UE and the base station, and the E-DCH related resource corresponds to an E-DCH as a common transmission channel; to convert a protocol layer data packet received from a user equipment (UE) into a Frame Protocol (FP) frame with a UE identity (ID) of the UE, and to send the FP frame with the UE ID of the UE to the radio network control device through the E-DCH resource for transmission between the base station and the radio network control device, wherein the UE ID is for informing the radio network control device which UE the FP frame belongs to; and
the radio network control device is configured to send the request, which is for-configuring or reconfiguring the E-DCH related resource to the base station, to obtain the FP frame with the UE ID and to determine which UE the FP frame belongs to by the UE ID; wherein the parameter in the received request comprises at least one of: a signature list used when the UE performs a random access procedure through the E-DCH resource for transmission between the UE and the base station, and other parameter required when the UE performs the random access procedure through the E-DCH related resource, wherein the other parameter comprises at least one of a relevant physical-layer parameter, a transmission channel parameter and a transmission bearer parameter.

8. The system of claim 7, wherein the base station is further configured to receive the protocol layer data packet from the UE through the E-DCH resource for transmission between the UE and the base station, wherein the protocol layer data packet includes data and the UE ID of the UE, to determine which UE the protocol layer data packet belongs to according to the UE ID included in the protocol layer data packet.

9. The system of claim 8, wherein the protocol layer data packet is every protocol layer data packet sent by the UE to the base station through the E-DCH resource for transmission between the UE and the base station.

10. The system of claim 8, wherein the protocol layer data packet is a protocol layer data packet firstly sent by the UE to the base station through the E-DCH resource for transmission between the UE and the base station.

11. The system of claim 7, wherein the base station is further configured to receive the protocol layer data packet from the UE through the E-DCH resource for transmission between the UE and the base station, wherein the protocol layer data packet includes data, to determine which UE the protocol layer data packet belongs to according to the UE ID included in a protocol layer data packet other than the protocol layer data packet.

12. The system of claim 7, wherein the base station is further configured to send a response to the radio network control device to indicate information of the E-DCH related resource being configured or reconfigured.

13. A base station, comprising:
a transceiver for communicating with a radio network control device, configured to receive a request, which is for configuring or reconfiguring an enhanced dedicated channel (E-DCH) related resource, from the radio network control device, wherein the E-DCH related resource comprises an E-DCH resource for transmission between the base station and the radio network control device and an E-DCH resource for transmission between the UE and the base station, and the E-DCH related resource corresponds to an E-DCH as a common transmission channel;
a processor, configured to configure or reconfigure, depending on the request received, the E-DCH related resource according to a parameter in the request received by the transceiver; and to convert a protocol layer data packet received from a user equipment (UE) into a Frame Protocol (FP) frame with a UE identity (ID) of the UE; and
the transceiver for communicating with the radio network control device, further configured to send the FP frame with the UE ID to the radio network control device through the E-DCH resource for transmission between the base station and the radio network control device, wherein the UE ID is for informing the radio network control device which UE the FP frame belongs to;
wherein the parameter in the received request comprises at least one of: a signature list used when the UE performs a random access procedure through the E-DCH resource for transmission between the UE and the base station, and other parameter required when the UE performs the random access procedure through the E-DCH related resource, wherein the other parameter comprises at least one of a relevant physical-layer parameter, a transmission channel parameter and a transmission bearer parameter.

14. The base station of claim 13, wherein the base station further comprises a transceiver for communicating with the UE, wherein the transceiver for communicating with the UE is configured to receive the protocol layer data packet from the UE through the E-DCH resource for transmission between the UE and the base station, wherein the protocol layer data packet includes data and the UE ID of the UE; and the processor is further configured to determine which UE the protocol layer data packet belongs to according to the UE ID included in the protocol layer data packet received by the transceiver for communicating with the UE.

15. The base station of claim 14, wherein the protocol layer data packet comprises each protocol layer data packet sent by the UE to the base station through the E-DCH resource for transmission between the UE and the base station.

16. The base station of claim 14, wherein the protocol layer data packet is a protocol layer data packet firstly sent by the UE to the base station through the E-DCH resource for transmission between the UE and the base station.

17. The base station of claim 13, wherein the base station further comprises a transceiver for communicating with the UE, wherein the transceiver for communicating with the UE is configured to receive the protocol layer data packet from the UE through the E-DCH resource for transmission between the UE and the base station, wherein the protocol layer data packet includes data; and the processor is further configured to determine which UE the protocol layer data packet belongs to according to the UE ID included in a protocol layer data packet which is other than the protocol layer data packet and received by the transceiver for communicating with the UE.

18. The base station of claim 13, wherein the transceiver for communicating with the radio network control device is further configured to send a response to the radio network control device to indicate information of the E-DCH related resource being configured or reconfigured.

* * * * *